(12) United States Patent
Dunkleberger et al.

(10) Patent No.: US 8,785,771 B2
(45) Date of Patent: Jul. 22, 2014

(54) ZONAL UTILITY CONTROL SYSTEM

(76) Inventors: William Dunkleberger, Smryna, GA (US); John Evans, Sandy Springs, GA (US); Mehul Laliwala, Kennesaw, GA (US)

( * ) Notice: Subject to any disclaimer, the term of this patent is extended or adjusted under 35 U.S.C. 154(b) by 0 days.

(21) Appl. No.: 13/359,481

(22) Filed: Jan. 26, 2012

(65) Prior Publication Data
US 2013/0194768 A1 Aug. 1, 2013

(51) Int. Cl.
*H01J 5/00* (2006.01)
(52) U.S. Cl.
USPC ............ 174/50; 174/58; 174/500; 174/520; 361/728; 361/641; 361/796; 361/800
(58) Field of Classification Search
USPC ............ 361/728, 641, 796, 800; 174/50, 58, 174/500, 52
See application file for complete search history.

(56) References Cited

U.S. PATENT DOCUMENTS

| | | | | |
|---|---|---|---|---|
| 3,025,432 A * | 3/1962 | Giegerich | | 361/643 |
| 6,396,990 B1 * | 5/2002 | Ehn et al. | | 385/135 |
| 6,603,660 B1 * | 8/2003 | Ehn et al. | | 361/694 |
| 8,295,059 B1 * | 10/2012 | Conroy | | 361/796 |
| 2005/0033479 A1 * | 2/2005 | Parker | | 700/282 |
| 2006/0269216 A1 * | 11/2006 | Wiemeyer et al. | | 385/147 |
| 2007/0070583 A1 * | 3/2007 | Callsen et al. | | 361/603 |
| 2009/0065247 A1 * | 3/2009 | Shelton et al. | | 174/520 |
| 2010/0237695 A1 * | 9/2010 | Covaro et al. | | 307/19 |
| 2011/0004357 A1 * | 1/2011 | Mathiowetz | | 700/295 |

* cited by examiner

Primary Examiner — Tuan T Dinh
Assistant Examiner — Steven T Sawyer

(57) ABSTRACT

A controller for controlling the utilization of resources within a zone having a housing having an interior carrying a barrier for utilization in defining a line voltage compartment delineated from a low voltage compartment within said housing interior. A power control board is carried within the line voltage compartment for receiving line voltage. A low voltage board is carried within the low voltage compartment for communicating with low voltage components. A controller board is carried by the housing for receiving data associated with the low voltage components and receiving line voltage from the line power control board. A first cover encloses a first portion of the interior of the housing for defining the line voltage compartment. A second cover encloses a second portion of the interior of the housing for defining the low voltage compartment.

7 Claims, 9 Drawing Sheets

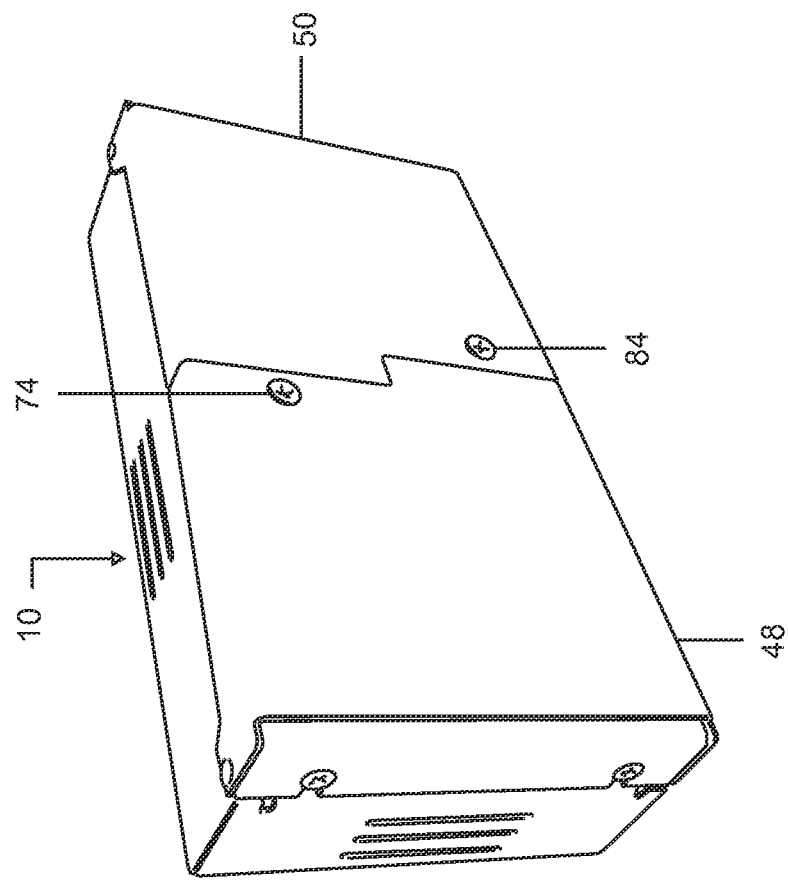

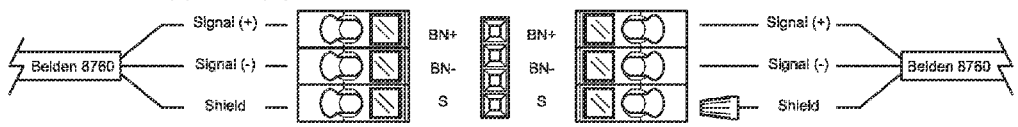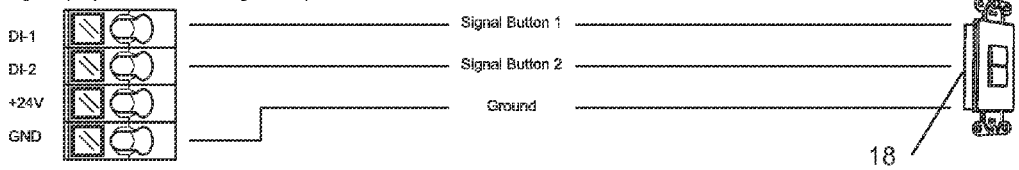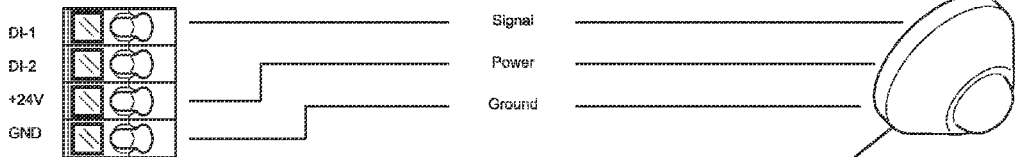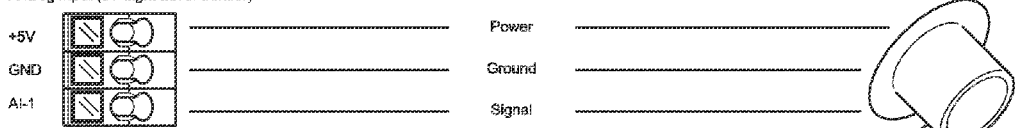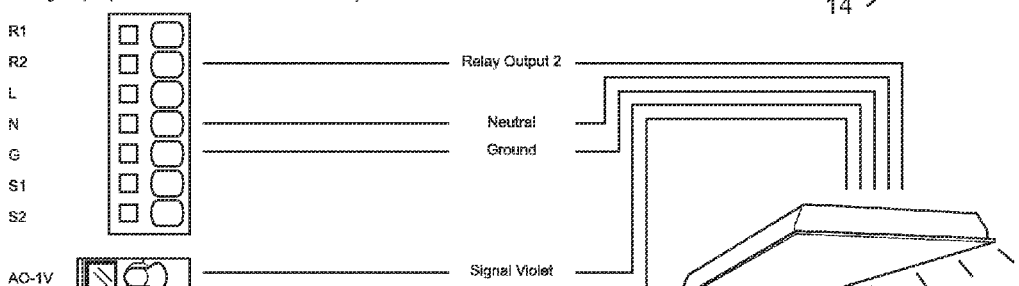
FIG. 5

ZONAL UTILITY CONTROL SYSTEM

FIELD OF INVENTION

The present invention relates to a control system for controlling the utilization of utilities within a predetermined zone which utilizes a unitary distribution assembly for managing the operation of both line voltage loads and low voltage loads.

BACKGROUND OF INVENTION

Commercial buildings consume more energy than any other sector of the U.S. economy including transportation and industry. According to the U.S. Department of Energy, heating, ventilation, and air conditioning along with lighting account for over 50% of the controllable energy use. In order to manage the utilization of energy by both HVAC and lighting systems, an attempt has been made to develop "smart" buildings which utilize sensors and controllers for manipulating the utilization of energy related to these activities. These systems generally include specially designed low voltage equipment for sensing and regulating the deployment of energy. Typical sensors include occupancy sensors, light intensity sensors, temperature sensors and the like. Such equipment is typically incorporated into a building automation system which includes a network of computers for monitoring and regulating the operation of these energy conservation systems.

While such systems are useful for their intended purposes, each system typically has a propriety design unique to the specific manufacturer requiring entire implementations to consist of equipment from a single manufacturer. By utilizing unique equipment design features, it is difficult if not impractical to utilize different equipment from different manufacturers during the design and implementation of a "smart" energy control system in a building. What occurs is that a design is "locked" into a particular manufacturer. This typically produces constraints on the design of such a system and economic inefficiencies.

Some equipment manufacturers utilize control logic which is incorporated into the specific device. Accordingly for a specific set of sensors and lighting instruments utilized in a designated area defining a zone any updates to the control logic for a particular device or the zonal operational parameters must be applied to each device separately. This is a time consuming endeavor. Additional systems utilize independent control systems which are directly interfaced with the respective devices. These systems utilize special interface cables which are difficult to utilize in the field.

In addition to low voltage systems, buildings obviously utilize high voltage also known as line voltage. Line voltage is utilized for typical energy requirements. A key factor when considering the installation of line and low voltage systems is that the certification of electricians is distinct for line voltage applications and low voltage applications. In addition to the certification differences, each system requires different installation considerations and specific tooling. Accordingly, line voltage systems are discrete from low voltage systems and the respective equipment including junction boxes and the respective wiring is typically undertaken at different locations requiring duplicative resources for space and installation efforts. Additionally, the wiring for low voltage systems which include coaxial cable, fiber optics and other Category 5 cable must be handled much more carefully during installation than high voltage conduits. The high voltage conduit is also typically insulated such as being carried in pipes. Different skillsets are required depending on if the installation is low voltage or high voltage.

Accordingly there is a need for a centralized control interface for both low and line voltage systems which also has the ability to control the respective energy loads and which can be easily accessible by the respective licensed electricians such that the high voltage components are distinct from the low voltage components while still minimizing installation space and effort.

SUMMARY OF INVENTION

A controller for controlling the utilization of resources within a zone having a housing having an interior carrying a barrier for utilization in defining a line voltage compartment delineated from a low voltage compartment within said housing interior. A power control board is carried within the line voltage compartment for receiving line voltage. A low voltage board is carried within the low voltage compartment for communicating with low voltage components. A controller board is carried by the housing for receiving data associated with the low voltage components and receiving line voltage from the line power control board. A first cover encloses a first portion of the interior of the housing for defining the line voltage compartment. A second cover encloses a second portion of the interior of the housing for defining the low voltage compartment.

BRIEF DESCRIPTION OF THE DRAWINGS

The methods and systems designed to carry out the invention will hereinafter be described, together with other features thereof. The invention will be more readily understood from a reading of the following specification and by reference to the accompanying drawings forming a part thereof:

FIG. 3B illustrates the housing of the centralized controller having separate access points for high and low voltage chambers;

FIG. 5 is a schematic illustrating the wiring configuration for the low voltage control system according to the present invention;

DESCRIPTION OF THE PREFERRED EMBODIMENT

Referring now in more detail to the drawings, the invention will now be described in more detail.

Figure 1:
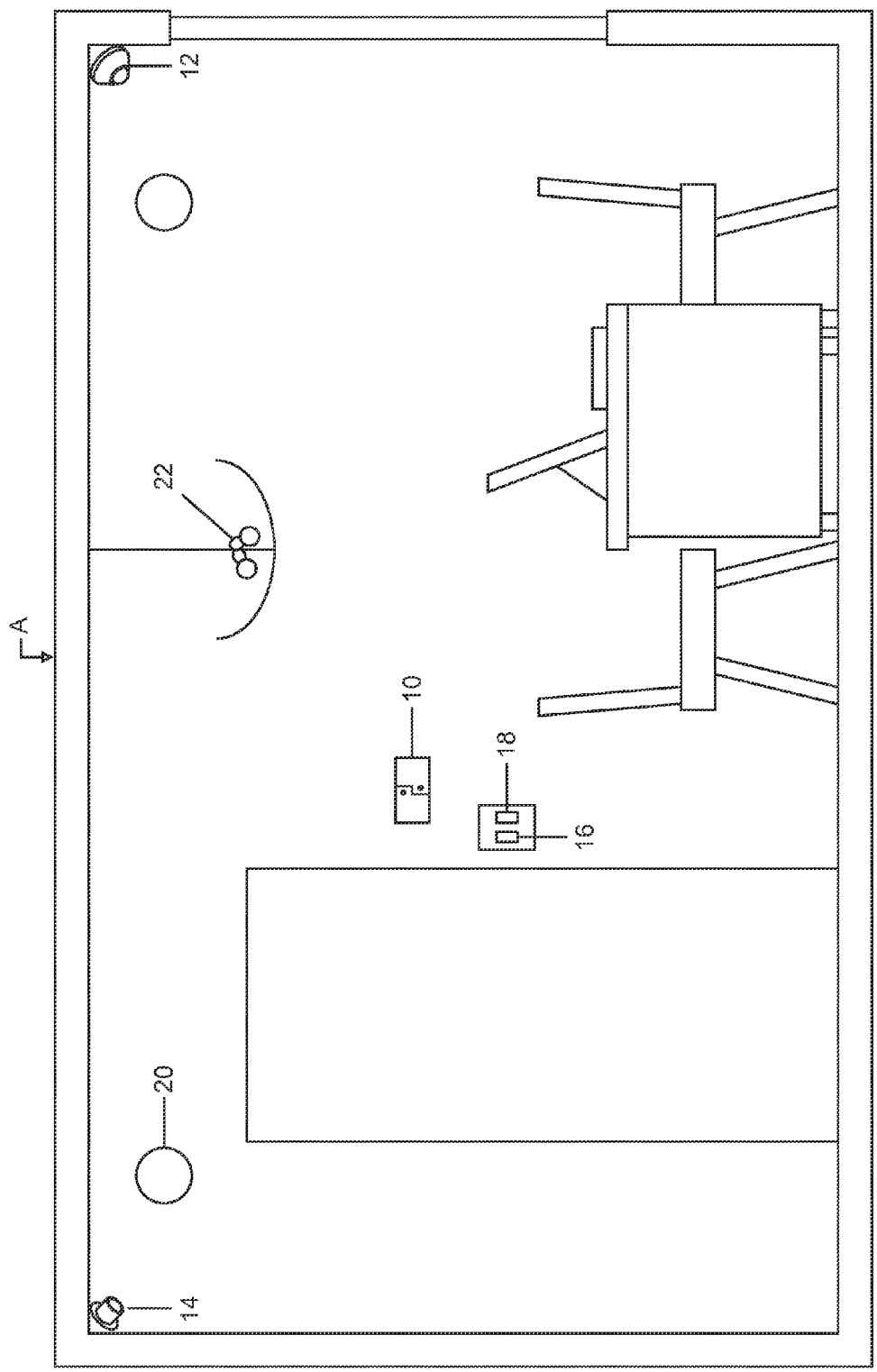
FIG. 1 illustrates a zone utilizing an energy conservation control system according to the present invention.

FIG. 1 illustrates an implementation of a smart energy control system A for controlling the deployment of energy within a designated zone or area. A zone may be a room or part of a room depending on the building's configuration. The energy utilization within the zone may be monitored and controlled by utilizing sensors which sense certain conditions within the zone such as the presence of individuals, occupancy sensors 12, or the amount of natural light within a room via light sensors 14. These sensors send data input signals to a controller which may directly or indirectly manipulate the operation of certain energy loads within the room based upon the received data input signals. For instance, lighting fixtures within the zone may be directly controlled via low voltage circuitry. In addition to receiving input from sensors, both line and low voltage 16, 18 switches may be utilized for controlling the respective light fixtures, line voltage lights 20 and low voltage lights 22 directly.

Figure 2:
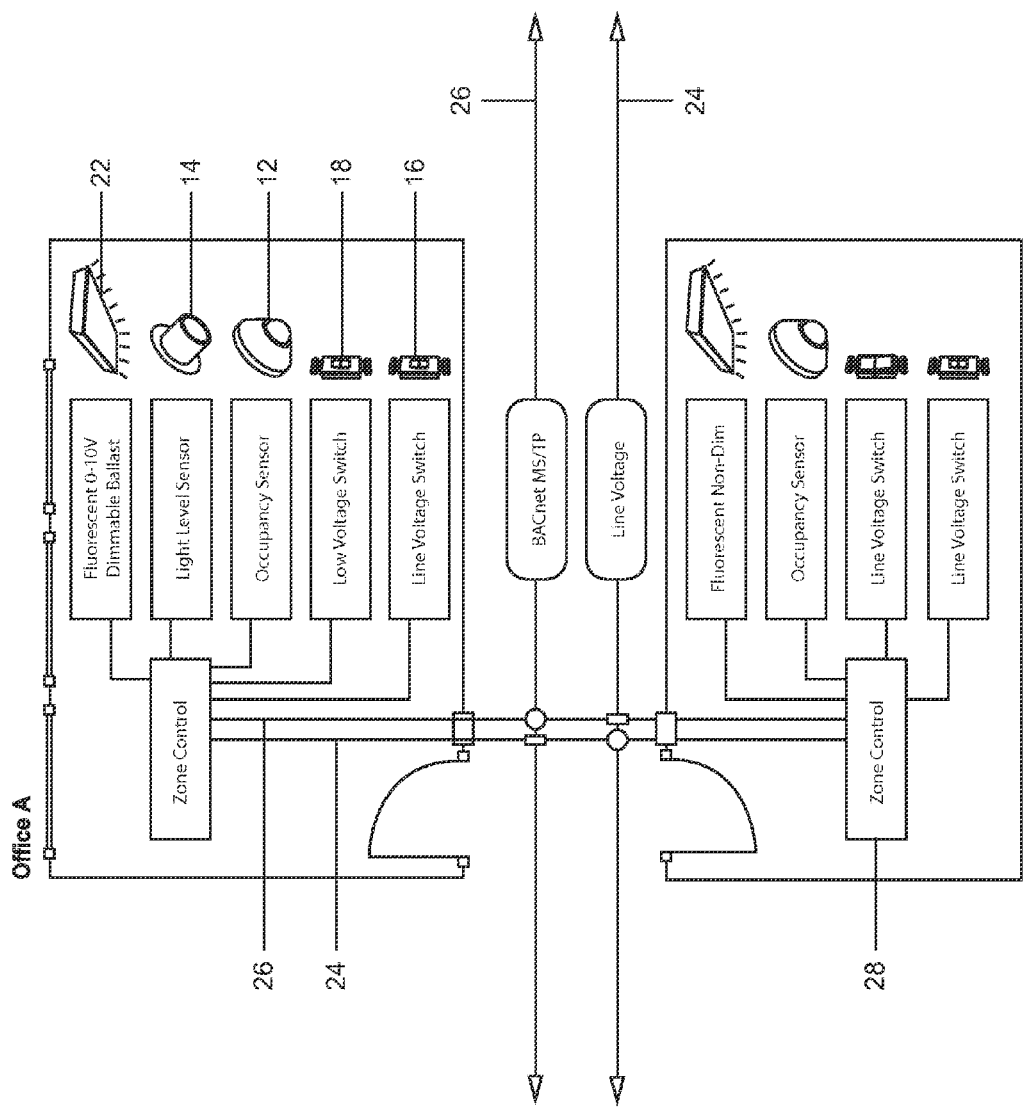
FIG. 2 illustrates a schematic of an embodiment of an energy conservation control system according to the present invention.

FIG. 2 illustrates a schematic of a smart energy control system A which includes a zone controller 10 operating in conjunction with both line voltage circuits and low voltage circuits for interacting with the various loads and sensors within the smart energy control system A. Zone controller 10 is in communication with certain sensors which may include an occupancy sensor 12 and a light level sensor 14. Additionally the zone controller is in communication with line voltage switch 16 and low voltage switch 18 for receiving information regarding the status of the respective switches. In conjunction with the respective switches, zone controller 10 is in communication preferably with a dimmable ballast of low voltage light 22 and line voltage circuit 24. Zone controller 10 is also preferably integrated within a networked Building Automation Control system 26 via an open protocol such as BACNET for receiving and transmitting data relating to the operation of the zone controller and the respective areas it is utilized to control. Multiple zone controllers 28 may be utilized and interconnected with the Building Automation Control system and line voltage networks dispersed throughout the building.

As illustrated in FIG. 2, line voltage 24 is wired continuously throughout the system as is customary. Line voltage 24 is provided directly to zone controller 10 providing current to the various electrical systems embodied within zone controller 10 and also to those which are interconnected with zone controller 10, including both line voltage loads and low voltage loads 20 and 22. This construction enables one system interface to be utilized for the various loads within a designated area.

Figure 3:
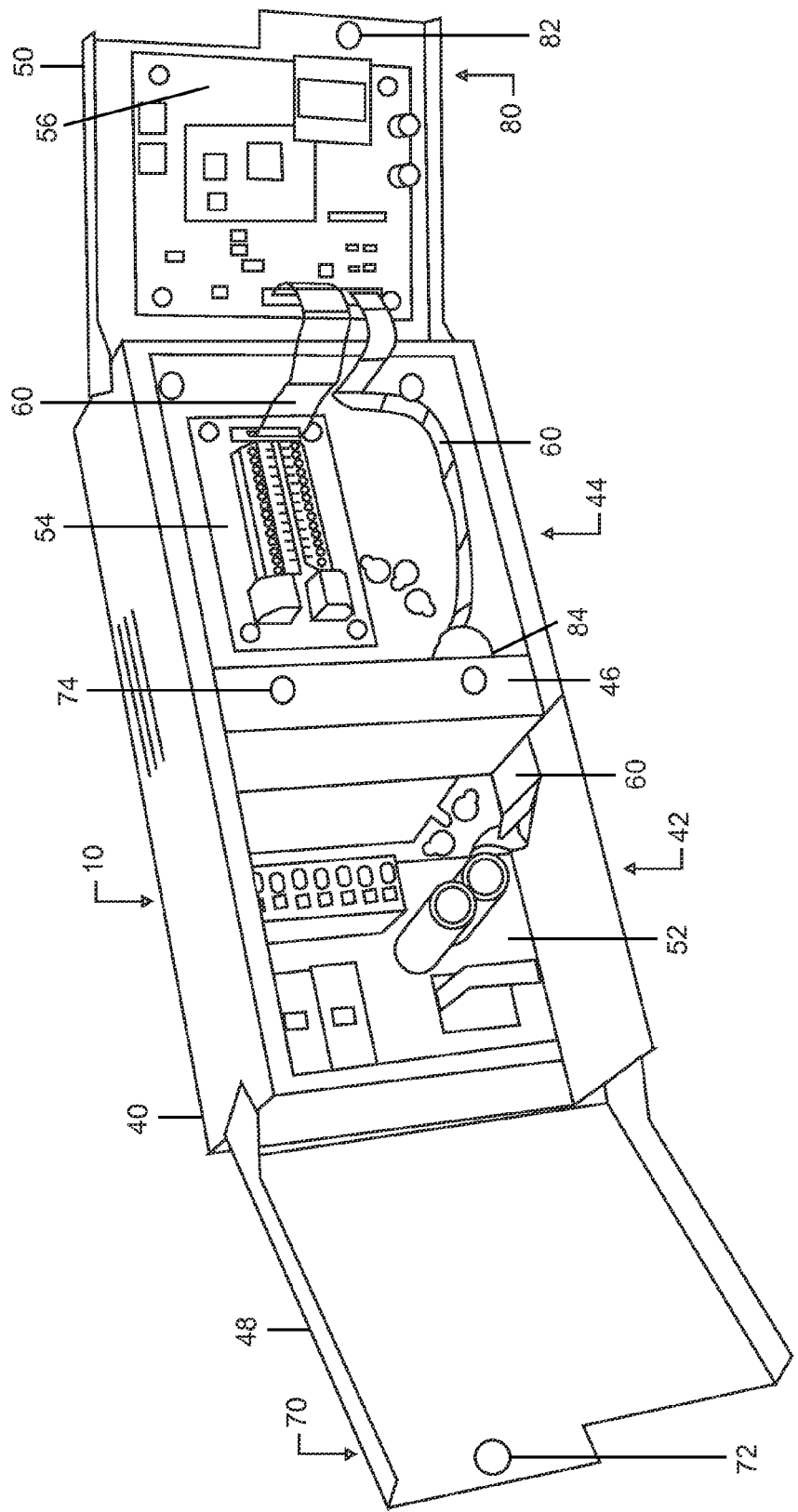
FIG. 3 illustrates the interior construction of a centralized controller for controlling high and low voltage loads according to the present invention.

FIG. 3 illustrates the components of zone controller 10. Zone controller 10 includes a single housing 40 for enclosing the components. Housing 40 preferably includes a line voltage compartment 42 and a low voltage compartment 44 defining interiors within housing 40. The line voltage compartment 42 and low voltage compartment 44 are isolated from each other via compartment barrier 46. Compartment barrier 46 preferably is releasably secured within housing 40 for limited removal in mounting the housing 40 to a junction box via attachment points discussed herein.

Housing 40 includes a first hinged cover 48 for enclosing line voltage compartment 42 and a second hinged cover 50 for enclosing low voltage compartment 44. A unique feature of the invention is the utilization of a single housing 40 for enclosing both line and low voltage components. Power control board 52 is enclosed within line voltage compartment 42. Low voltage board 54 is enclosed within low voltage compartment 44. In the preferred embodiment, controller board 56 controls the logic affiliated with controlling the operation of the smart energy control system A. Controller board 56 is preferably in close proximity to low voltage board 54 and carried by housing 40. Compartment barrier 46 separates power control board 52 from low voltage board 54.

To facilitate the separation of line voltage compartment 42 and low voltage compartment 44, first hinged cover 48 and second hinged cover 50 have separate locking mechanisms for restricting access to the respective compartments. A first locking mechanism 70 restricts access to line voltage compartment 42. Preferably first locking mechanism 70 includes first hinged cover 48 carrying first hinged cover lock 72 which interacts with a first hinged lock receptacle 74 carried by compartment barrier 46. A second locking mechanism 80 restricts access to low voltage compartment 44. Preferably second locking mechanism 80 includes second hinged cover 50 carrying second hinged cover lock 82 which interacts with a second hinged lock receptacle 84 carried by compartment barrier 46. First and second locking mechanisms are unique barriers requiring distinct access. In this manner access to line voltage circuitry is preferably restricted to those individuals qualified to interact with line voltage whereas the low voltage circuitry is preferably restricted to those individuals qualified to interact with low voltage. In operation, both first and second hinged covers are locked into place preventing access to either line or low voltage compartments. Access is only provided by the manipulation of the respective locking mechanisms for a particular hinged cover. When the respective hinged cover is open, compartment barrier 46 provides a boundary of the respective interior preventing access to the adjacent compartment.

Preferably controller board 56 is carried by second hinged cover 50 constituting a component of low voltage compartment 44 when second hinged cover 50 is closed. Power control board 52 distributes power to both line voltage loads, low voltage board 54 and associated low voltage loads in communication with low voltage board 54. Power is also provided to controller board 56. Preferably a series of cables 60 such as ribbon cables interconnect power control board 52, controller board 56, and low voltage board 54. Respective ribbon cable connections are carried by power control board 52, controller board 56 and low voltage board 54.

FIG. 3B illustrates zone controller 10 in a ready to use position. In this position, the respective line voltage and low voltage chambers are closed via the first and second hinged covers 48 and 50 respectively. The first and second hinged covers are locked into place utilizing screws or the like which are received via locking receptacles 74 and 84 respectively. Alternative locking means may be utilized for securing first and second hinged covers into place. In this manner access to the respective low and line voltage chambers is permitted while preventing access to the alternative voltage chamber.

Figure 4:
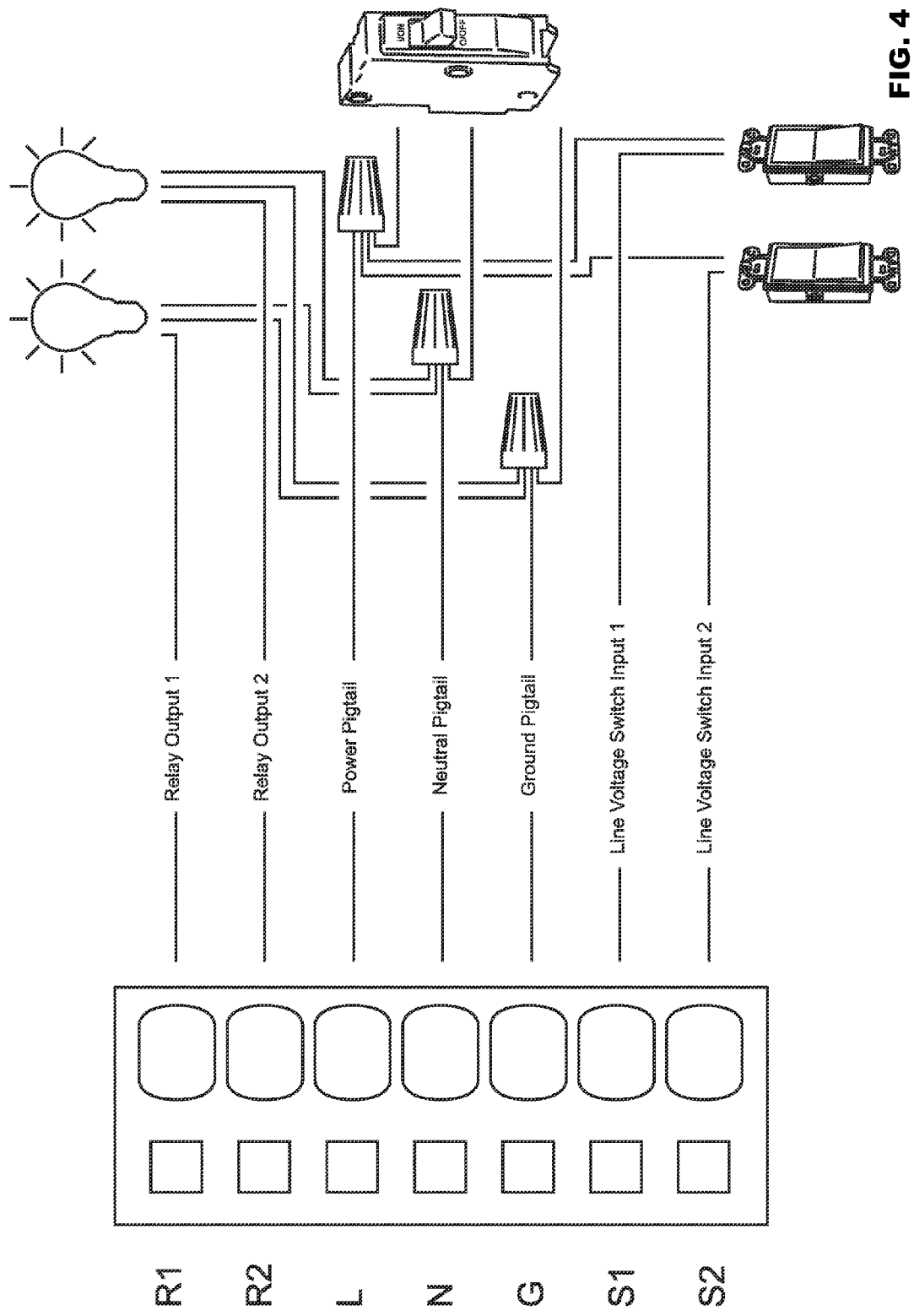
FIG. 4 is a schematic illustrating the wiring configuration for the line voltage control system according to the present invention.

FIG. 4 illustrates a schematic of a preferable input/output circuit diagram for power control board 52. Power control board 52 as illustrated includes seven input/outputs. The primary input is line voltage provided by a power pigtail and interconnected with input "L". Associated with the Power Pigtail are the corresponding Neutral Pigtail and Ground Pigtail interconnected at inputs "N" and "G" respectively. Additional inputs include line voltage components Switch Input 1 and Switch Input 2 which are connected with respective line voltage switches. These Switches are interconnected with inputs "S1" and "S2" respectively. Relay Outputs 1 and 2 respectively are utilized for controlling the delivery of line voltage to respective loads. These outputs are interconnected with outputs "R1" and "R2" respectively.

An opto-isolator circuit is utilized within the smart system for controlling the operation of line voltage loads associated with the respective relay outputs. In this manner. The opto-isolator is carried by ribbon cable 60 for transmitting signals to controller board 56. The signals may include the status of line voltage switches S1 or S2. Depending on logic associated with controller board 56, relay outputs R1 and R2 are controlled and in association the respective loads affiliated with the respective relay outputs are controlled. The opto-isolator circuit isolates the line voltage from the low voltage side of the system. In this manner, line voltage components may be controller or the status recorded by low voltage components. For instance, if a low voltage light sensor 14 detects that the amount of light in the room is at a particular level, this data may be submitted to the controller board. When a line voltage switch is activated, logic associated with the controller board may process the information from the respective light sensor and determine that the light level in the room is sufficient and deny power to be provided to the respective load associated with the respective line voltage switch. This is accomplished by denying the respective circuit to be completed with the associated relay output. Additionally, the system may merely utilize the status of the line voltage switch for monitoring the activity of a particular room.

FIG. 5 illustrates a schematic of a preferable input/output circuit diagram for low voltage board 54. Low voltage board 54 includes a plurality of inputs for receiving data from low voltage sensors utilized for determining certain parameters of the zone being controlled. These sensors may provide data relating to the status of a switch, an occupancy sensor, a light level sensor, temperature, etc. As illustrated low voltage board 54 includes a first digital input for a two button low voltage switch 18, a second digital input for an occupancy sensor 12, an analog input for a light level sensor 14 and an analog output for a dimmable ballast associated with light 22.

Additionally, low voltage board 54 includes low voltage network connections for interconnection with a Building Automation Control system. These connections include both input and output. This interface enables a remote control system to provide operational instructions to the controller and also receive information associated with the respective operational characteristics of the zone being controlled. Such information may include the operational utilization of energy, or merely the occurrence of events such as the respective light monitored at different periods of the day, and the overall utilization of a respective zone by occupants. Such data may be utilized by energy management committees for determining the appropriate resources necessary for particular zones. Furthermore, as the system is presented, line voltage utilization may also be monitored with the interconnection of the line voltage circuitry with the controller board and low voltage board.

Figure 6:
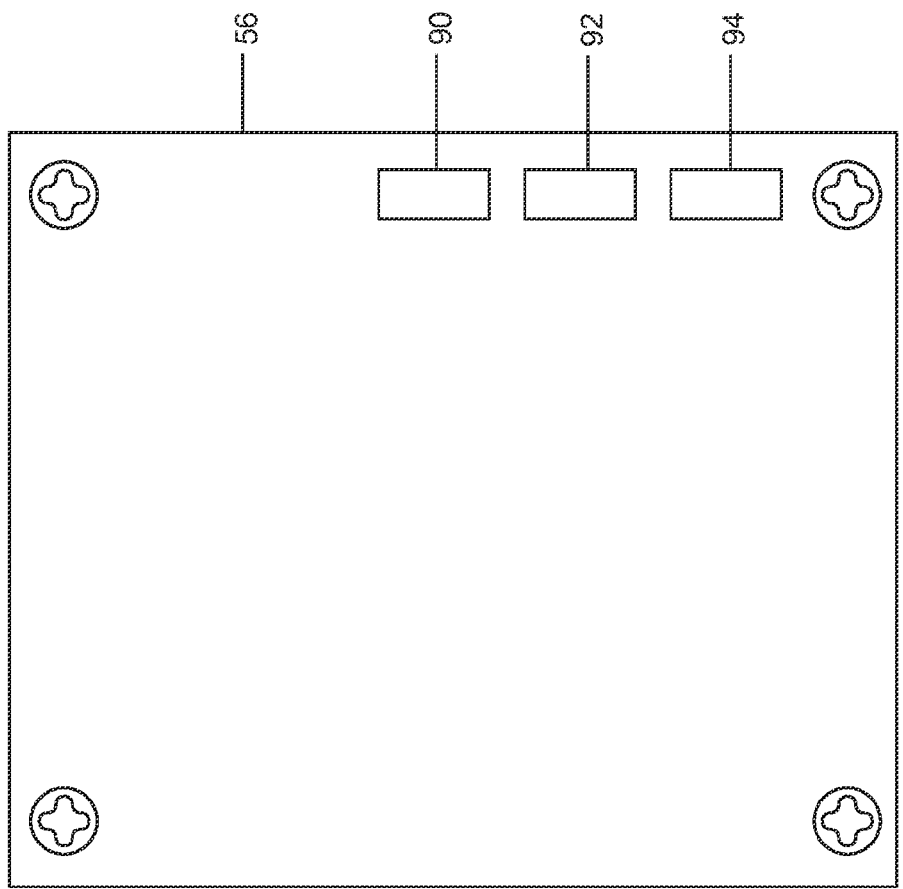
FIG. 6 is a perspective of a controller board for controlling the operation of the high and low voltage control system according to the present invention.

As shown in FIGS. 3 and 6 controller board 56 is interconnected with both power control board 52 and low voltage board 54. Preferably controller board 56 includes a cpu 90, memory 92 and a wireless communication interface 94. Preferably wireless communication interface 94 is suitable for receiving Bluetooth transmitted signals. It has been found that the bandwidth associated with Bluetooth signals provides the least interference in a building environment which typically is receiving multitudes of signals over varying bandwidths and frequencies. An advantage of having a Bluetooth receiver associated with housing 40 is that housing 40 may be located out of visual site in a particular zone providing for an aesthetic environment while still being accessible for via wireless signals for reprogramming the respective controller board. Additionally, should a need be required to locate the particular housing, the housing may be "pinged" and a return signal transmitted provided for identifying the location of the respective housing. Also, additional components typical to circuit boards may be affiliated with controller board 56.

Figure 7:
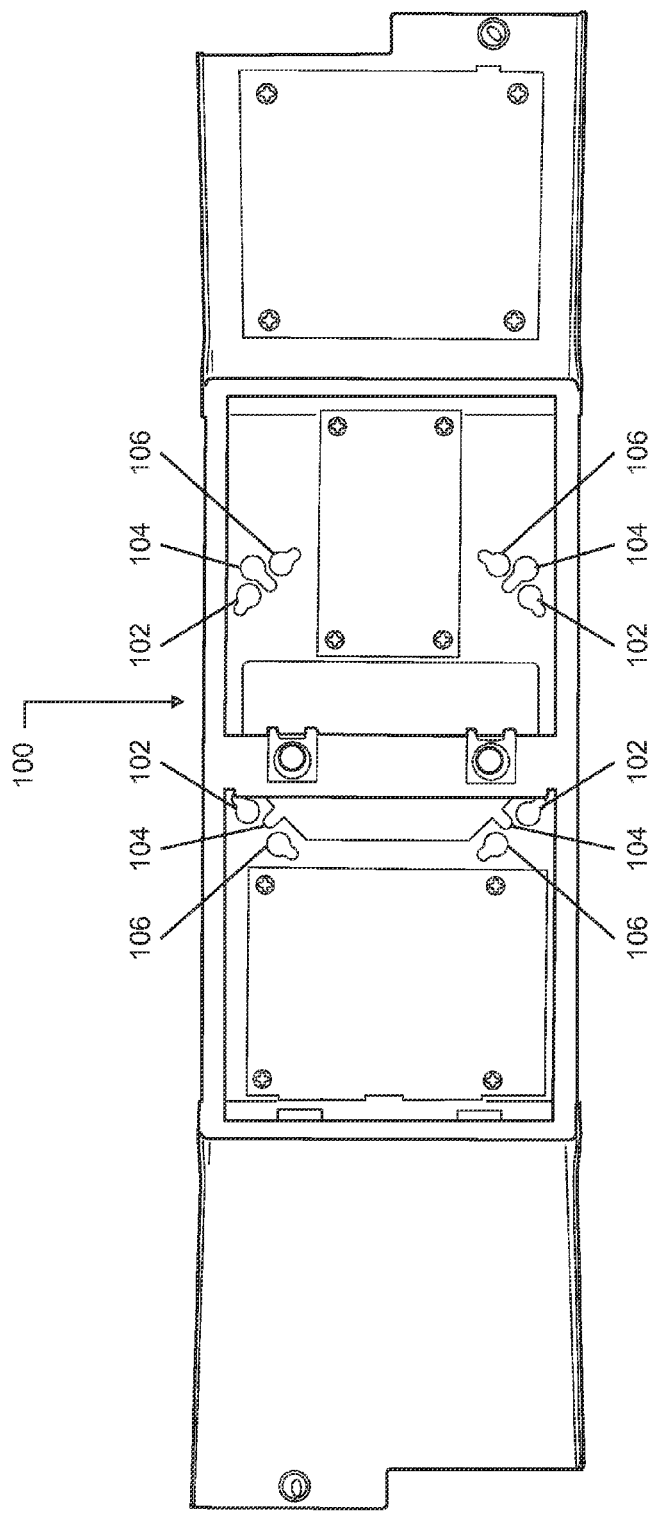
FIG. 7 is a perspective of the interface construction for the controller for interfacing with a junction box.

FIG. 7 illustrates housing 40 and the respective interface for interconnection with a "J" box for installation. Housing 40 incorporates a plurality of fastener openings 100. Fastener openings include varying channels configured for interfacing with varying "J" boxes. In particular, junction boxes, "J" boxes, are constructed of varying configurations. Certain types of "J" box configurations include a 4" square Junction Box, a 4" octagon box, and a $4^{11}/_{16}$" box. Each of these configurations has different spacings for receiving screws for attachment thereto. Accordingly, to accommodate the varying the junction boxes which may exist at a particular installation, housing 40 includes the plurality of fastener openings which are spaced to receive fasteners for attaching to the varying configurations of "J" boxes. For instance, a first plurality of fastener receptacles 102, may be utilized for being attached to a first configuration of a "J" box, a second plurality of fastener receptacles 104 may be utilized for being attached to a second configuration of a "J" box, and a third plurality of fastener receptacles 106 may be utilized for being attached to a third configuration of a "J" box. This system provides flexibility for incorporating the controller in pre-existing electrical circuits already incorporated into a building.

Additionally, the controller's retro-fitting capabilities is further provided by incorporating the power control board and associated line voltage controls in the overall system. The presence of the power control board and the inputs and outputs associated with line voltage switches and loads enables the controller to be incorporated into pre-existing line voltage systems preventing the need for removing pre-existing equipment. This flexibility provides an enhanced benefit of the control system in its incorporation into pre-existing building circuits.

Figure 8:
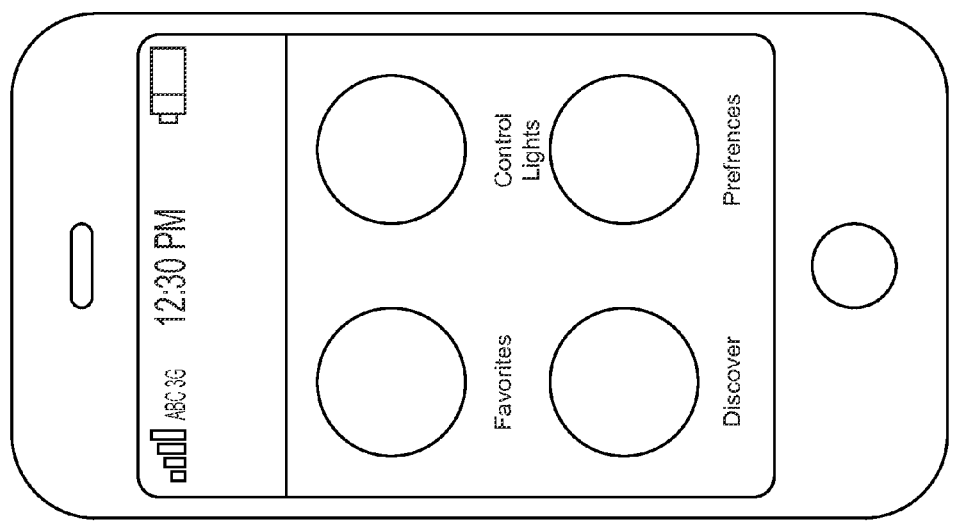
FIG. 8 is a perspective of a hand held device for controlling the operation of the control system via wireless communication.

FIG. 8. illustrates a remote device which may control the operation of zone controller 10 via Bluetooth communication. The remote device may incorporate an application which send control signals to the controller board for controlling the operating of low voltage board components. For instance, the remote control device may be utilized to temporarily adjust the lighting of a particular zone. As an example, a classroom may include three different sets of lights; those close to windows, those in the middle of the room, and those farthest away from the middle. Depending on the environment, the remote device may include features for controlling the light. In particular, the intensities of the varying lights may be adjusted within a range of "maximum" to "minimum". In this manner, the remote device may control the lights depending on the desired properties of the individuals in the room at the particular time. Additionally, if the room is intended to be utilized for an event requiring the lights to be utilized in a particular manner for that particular occasion, the remote device may have a "preference" setting pre-established. For instance, if a movie was being shown, the "preference" listing may turn down all of the lights except a select view depending on the configuration of the room. Or, as an alternative, if the room was being utilized for a presentation, a different lighting configuration may exist where a particular location of the room was fully lit for a speaker whereas the remainder of the room was darken. Accordingly, the remote device enables temporary adjustment to the lighting system utilizing the zonal controller.

Thus, it may be seen that a more advantageous system for controlling the utilization of energy resources within a particular zone may be had utilizing the present invention. A zone controller incorporates both line and low voltage boards in association with a controller board for controlling the operation of energy resources utilizing a single housing. This is achieved by separating the line and low voltage compartments contained within the interior of the single housing and restricting access to the respective voltage compartments utilizing distinctive locking mechanisms for each compartment. Additionally, the controller is operable to control both line and low voltage resources which enables the controller to be utilized in retrofitting pre-existing line voltage circuitry for incorporating low voltage components.

We claim:

1. A controller for controlling the utilization of electrical resources within a zone which include devices utilizing both line voltage and low voltage comprising: a housing having an interior carrying a barrier for utilization in defining a line voltage compartment delineated from a low voltage compartment within said housing interior; a power control board carried within said line voltage compartment for receiving line voltage and for providing the provision of said line voltage to an external device utilizing said line voltage; a low voltage board carried within said low voltage compartment for providing low voltage to an external low voltage device; said low voltage board including circuitry interfacing with said power control board for receiving voltage from said power control board and transferring said voltage to the low voltage external device; a controller board carried by said housing for receiving data associated with said low voltage components and receiving line-voltage from said line power control board; a first cover for enclosing a first portion of the interior of said housing for defining said line voltage compartment; a second cover for enclosing a second portion of the interior of said housing for defining said low voltage compartment; and wherein said power control board includes interfaces for interfacing with at least one line voltage device; said line voltage devices includes lights or heating and air conditioning devices; said controller board controls the operation of said line voltage device; wherein the line voltage to an external device utilizing line voltage is regulated utilizing the data received by the low voltage board from the low voltage devices; and said controller board utilizes an opto-isolator for communicating control signals to said power control board for controlling the operation of said line voltage device.

2. The controller of claim 1 including a first locking mechanism for securing said first cover to said housing; and a second locking mechanism for securing said second cover to said housing.

3. The controller of claim 1 wherein said first locking mechanism utilizes an unlocking mechanism distinct from said second locking mechanism.

4. The controller of claim 1 wherein said controller board includes a processing unit and memory for further controlling said low voltage components.

5. The controller of claim 1 including a wireless receiver carried by said controller board for controlling the operation of said low voltage components.

6. The controller of claim 5 wherein said wireless receiver operates utilizing bluetooth technology.

7. A system for regulating the utilization of electricity comprising: an electrical appliance utilizing line voltage;
a low voltage sensor for sensing a parameter utilizing in regulating the provision of line voltage to said electrical appliance; a controller for controlling the utilization of provision of line voltage to said electrical appliance comprising: a housing having an interior carrying a barrier for utilization in defining a line voltage compartment delineated from a low voltage compartment within said housing interior; a power control board carried within said line voltage compartment for receiving line voltage and for providing said line voltage to said electrical appliance when determined suitable; a low voltage board carried within said low voltage compartment for providing low voltage to said low voltage sensor; said low voltage board including circuitry interfacing with said power control board for receiving voltage from said power control board and transferring said voltage to the low voltage sensor; a controller board carried by said housing for receiving data from said low voltage sensor identifying if line voltage should be supplied to said electrical appliance; a first cover for enclosing a first portion of the interior of said housing for defining said line voltage compartment; a second cover for enclosing a second portion of the interior of said housing for defining said low voltage compartment and wherein the line voltage to the electrical appliance is regulated utilizing the data received by the low voltage board from the low voltage sensor.

* * * * *